United States Patent
Fradkin et al.

(10) Patent No.: US 10,162,697 B2
(45) Date of Patent: Dec. 25, 2018

(54) BUILDING A FAILURE-PREDICTIVE MODEL FROM MESSAGE SEQUENCES

(71) Applicant: SIEMENS AKTIENGESELLSCHAFT, Munich (DE)

(72) Inventors: Dmitriy Fradkin, Princeton, NJ (US); Fabian Moerchen, Bainbridge Island, WA (US)

(73) Assignee: Siemens Aktiengesellschaft, Munich (DE)

( * ) Notice: Subject to any disclaimer, the term of this patent is extended or adjusted under 35 U.S.C. 154(b) by 303 days.

(21) Appl. No.: 14/428,115

(22) PCT Filed: Jul. 23, 2013

(86) PCT No.: PCT/US2013/051658
§ 371 (c)(1),
(2) Date: Mar. 13, 2015

(87) PCT Pub. No.: WO2014/022154
PCT Pub. Date: Feb. 6, 2014

(65) Prior Publication Data
US 2015/0309854 A1  Oct. 29, 2015

Related U.S. Application Data

(60) Provisional application No. 61/678,740, filed on Aug. 2, 2012.

(51) Int. Cl.
*G06F 11/30* (2006.01)
*G06F 11/07* (2006.01)
(Continued)

(52) U.S. Cl.
CPC .......... *G06F 11/079* (2013.01); *G06F 11/008* (2013.01); *G06F 11/0751* (2013.01);
(Continued)

(58) Field of Classification Search
CPC ............ G06N 5/02; G06N 5/04; G06N 5/045; G06N 5/046; G06N 5/047; G05B 23/0227;
(Continued)

(56) References Cited

U.S. PATENT DOCUMENTS

| | | | |
|---|---|---|---|
| 7,017,080 B1 * | 3/2006 | Liggesmeyer | G05B 23/0248 714/26 |
| 2006/0265201 A1 * | 11/2006 | Martin | G06Q 10/06 703/6 |

(Continued)

FOREIGN PATENT DOCUMENTS

EP  2275933 A1  1/2011

OTHER PUBLICATIONS

Mining Frequent Max and Closed Sequential Patterns by Ramin Afshar University of Alberta, 2000 http://citeseerx.ist.psu.edu/viewdoc/download?doi=10.1.1.5.6570&rep=rep1&type=pdf.*

(Continued)

*Primary Examiner* — Joseph O Schell

(57) ABSTRACT

A method to build a failure predictive model includes: receiving an input of a set of event sequences, where each sequence is labeled as representing a failure or not representing a failure, extracting a single predictive closed pattern from among the input sequences that represents a failure, creating a root node with the single closed pattern, splitting the set of event sequences into a first set that includes the single closed pattern and a second set that excludes the single pattern, and processing each of the first and second sets until at least one child node is created that is labeled as either representing a failure or not representing a failure.

19 Claims, 11 Drawing Sheets

(51) Int. Cl.
*G06F 11/00* (2006.01)
*G05B 23/02* (2006.01)
*G06N 5/04* (2006.01)

(52) U.S. Cl.
CPC ........ *G05B 23/024* (2013.01); *G05B 23/0227* (2013.01); *G05B 23/0229* (2013.01); *G06F 11/30* (2013.01); *G06N 5/04* (2013.01)

(58) Field of Classification Search
CPC .............. G05B 23/024; G05B 23/0243; G05B 23/0254; G05B 23/0245; G05B 23/0229; G05B 23/0232; G06F 11/008; G06F 11/30; G06F 11/079
See application file for complete search history.

(56) References Cited

U.S. PATENT DOCUMENTS

| | | | | |
|---|---|---|---|---|
| 2010/0332540 | A1* | 12/2010 | Moerchen | G06F 11/008 707/776 |
| 2011/0029824 | A1* | 2/2011 | Scholer | G05B 23/0224 714/47.3 |
| 2011/0276832 | A1* | 11/2011 | Schneider | G05B 23/0262 714/37 |
| 2014/0351677 | A1* | 11/2014 | Xiang | G06F 17/504 714/796 |

OTHER PUBLICATIONS

Wang, Jianyong, et al.; "Frequent Closed Sequence Mining without Candidate Maintenance;" IEEE Transactions on Knowledge and Data Engineering, IEEE Service Center, Los Alamitos, CA, US; vol. 19, No. 8, pp. 1042-1056; XP011186383; 2007; US; Aug. 1, 2007.

\* cited by examiner

| Sequence Identifier | Sequence |
| --- | --- |
| 1 | C A A B C |
| 2 | A B C B |
| 3 | C A B C |
| 4 | A B B C A |

FIG. 4

Algorithm 1 BIDE Algorithm

Require: Sequential Pattern $P = \{p_i\}$, Projected Database $D|P$, minimum support $\mu$ 1: $F$ – set of frequent closed patterns
2: $l = |P|$
3: $Ls = sStepFrequentItems(P, D|P, \mu)$;
4: $Li = iStepFrequentItems(P, D|P, \mu)$;
5: if !(frequencyCheck($Ls, P$) || frequencyCheck($Li, P$)) then
6:    if backscan($P', D',$ true) then
7:       $F = F \cup P$
8:    end if
9: end if
10: for itemset $p \in Ls$ do
11:    $P' = p_1, \ldots, p_i, p$
12:    if backscan($P', D|P',$ false) then
13:       $F = F \cup bide(P', D', \mu)$;
14:    end if
15: end for
16: for itemset $p \in Li$ do
17:    $P' = p_1, \ldots, p_{i-1}, p_i \cup p$
18:    if backscan($P', D|P',$ false) then
19:       $F = F \cup bide(P', D', \mu)$;
20:    end if
21: end for
22: return $F$

FIG. 5

| Sequence Identifier | Sequence | Class Information |
|---|---|---|
| 1 | C A A B C | Failure |
| 2 | A B C B | No Failure |
| 3 | C A B C | No Failure |
| 4 | A B B C A | Failure |

FIG. 7

Algorithm 2 BIDE Discriminative Algorithm

Require: Sequential Pattern $P = \{pi\}$, Projected Database $D|P$, minimum support $\mu$, threshold for $IG$ of a pattern $-dt$ 1: $F$ - set of frequent closed patterns (global variable)
2: $dt$ - minimal threshold for IG of a pattern (global variable)
3: $igUB = IG_{ub}(P)$
4: if $igUB < dt$ then
5:    return
6: end if
7: $l = |P|$
8: $Ls = sStepFrequentItems(P, D|P, \mu)$;
9: $Li = iStepFrequentItems(P, D|P, \mu)$;
10: $ig = IG(P)$
11: if $ig \geq dt$ then
12:    if $!(frequencyCheck(Ls, P) || frequencyCheck(Li, P))$ then
13:      if $backscan(P', D', true)$ then
14:        $F = F \cup P$
15:      end if
16:    end if
17: end if
18: for itemset $p \in Ls$ do
19:    $P' = p_1, ..., p_l, p$
20:    if $backscan(P', D|P', false)$ then
21:      $F = F \cup bide(P', D', \mu)$;
22:    end if
23: end for
24: for itemset $p \in Li$ do
25:    $P' = p_1, ..., p_{l-1}, p_l \cup p$
26:    if $backscan(P', D|P', false)$ then
27:      $F = F \cup bide(P', D', \mu)$;
28:    end if
29: end for
30: return $F$

FIG. 8

BUILDING A FAILURE-PREDICTIVE MODEL FROM MESSAGE SEQUENCES

CROSS-REFERENCE TO RELATED APPLICATIONS

This application claims priority to U.S. Provisional Application No. 61/678,740 filed on Aug. 2, 2012, the disclosure of which is incorporated by reference herein.

BACKGROUND

1. Technical Field

The present disclosure relates generally to prediction based on event sequences, and more particularly to prediction of failure based on sequences of messages from equipment or systems.

2. Discussion of Related Art

There is a strong trend towards using predictive methods to improve maintenance of equipment such as medical scanners, gas turbines, solar plants, computer software and so forth. Proactive maintenance strategies may significantly lower costs and improve customer satisfaction. Repairs can be done via scheduled downtime, spare parts can be ordered ahead of time, and computing resources can be reallocated in advance if there is strong evidence that a particular failure will occur.

It is useful to be able to find patterns indicative of an upcoming failure or a need for intervention. The above-mentioned systems may be produce large amounts of temporal data such as sensor measurements, log messages, execution traces, etc. Currently, an analyst is expected to manually look for failure-predictive patterns by examining this temporal data.

However, it can be very difficult for a human analyst to determine whether a sequence of events, e.g., a sequence of logged messages, is a pattern, and whether that pattern is likely to result in a future failure of equipment or a system. Thus, there is a need for an analytic approach that can determine automatically from the temporal data whether a subsequent failure is likely to occur.

SUMMARY

A method to find patterns indicative of failure according to an exemplary embodiment of the invention includes: incorporating class information indicating whether each of a plurality of example message sequences represents a failure into a Bi-directional extension (BIDE) algorithm to generate a discriminative BIDE (BIDE-discriminative) algorithm, using the BIDE-discriminative algorithm to output requested number of predictive patterns from the message sequences.

A method to predict a failure according to an exemplary embodiment of the invention includes: incorporating class information indicating whether each of a plurality of example message sequences represents a failure into a Bi-directional extension (BIDE) algorithm to generate a discriminative BIDE (BIDE-discriminative) algorithm, using the BIDE-discriminative algorithm to output a single pattern from the message sequences, building a decision tree to predict a failure based on the single pattern, and determining whether a new message sequence will cause failure using the decision tree.

A method to build a failure predictive model according to an exemplary embodiment of the invention includes: receiving an input of a set of event sequences, where each sequence is labeled as representing a failure or not representing a failure, extracting a single predictive closed pattern from among the input sequences, creating a root node with the single closed pattern, splitting the set of event sequences into a first set that includes the single closed pattern and a second set that excludes the single pattern, and processing each of the first and second sets until at least one child node is created that is labeled as representing a failure or not representing a failure.

BRIEF DESCRIPTION OF THE DRAWINGS

Exemplary embodiments of the invention can be understood in more detail from the following descriptions taken in conjunction with the accompanying drawings in which:

FIG. 4 shows an example of sequence database.

FIG. 5 shows exemplary pseudo-code for a BIDE algorithm.

FIG. 7 shows an example of sequence database with additional class information.

FIG. 8 pseudo-code according to an exemplary embodiment of the invention that is a modified version of the BIDE algorithm.

DETAILED DESCRIPTION

Exemplary embodiments of the invention are discussed in further detail with reference to FIGS. 1-10. This invention may, however, be embodied in different forms and should not be construed as limited to the embodiments set forth herein.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1A:
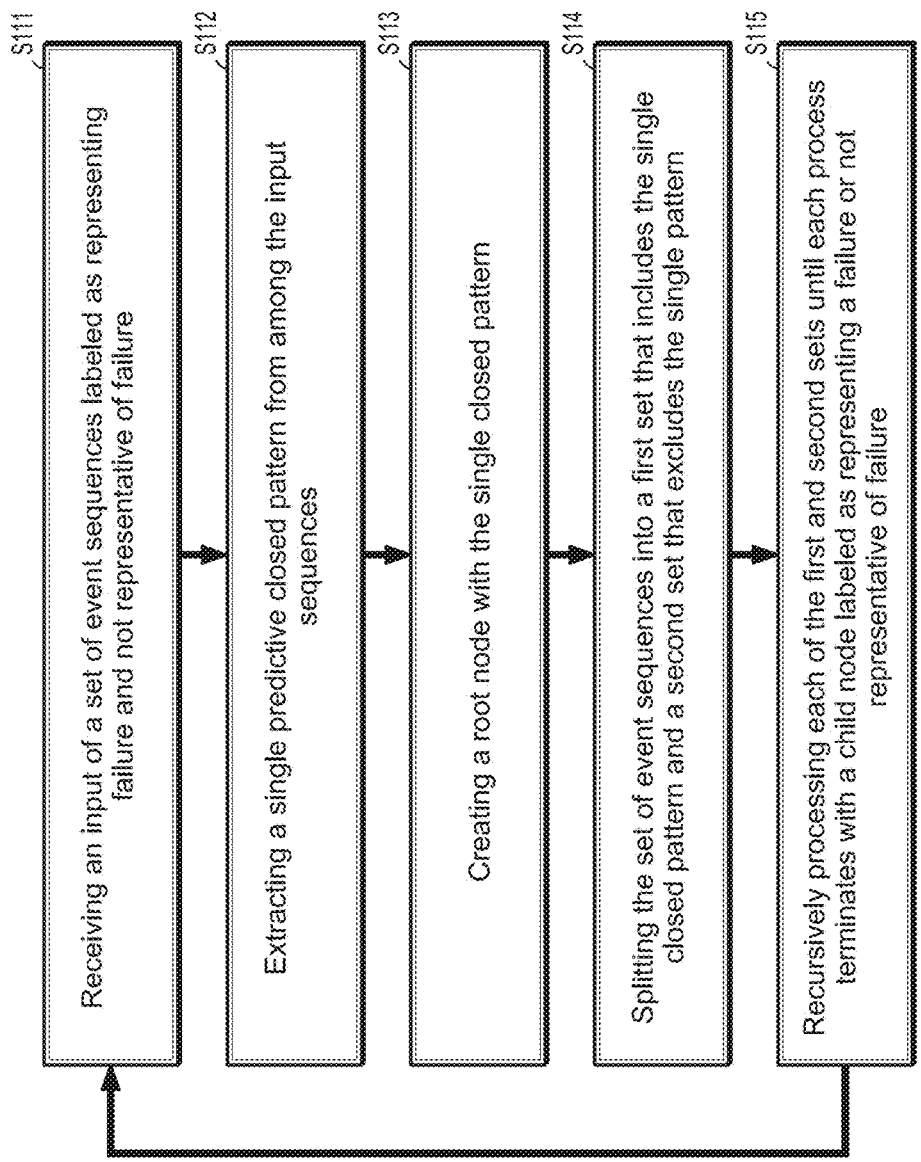
FIG. 1A illustrates a high-level flow chart of a method of building a failure predictive model according to an exemplary embodiment of the invention.

Referring to FIG. 1A, a method to build a failure predictive model according to an exemplary embodiment of the invention includes: receiving an input of a set of event sequences (S111), where each sequence is labeled as representing a failure or not representing a failure, extracting a single closed pattern from among the input sequences (S112), creating a root node with the single closed pattern, splitting the set of event sequences into a first set that includes the single closed pattern and a second set that excludes the single pattern (S113), and processing each of the first and second sets until at least one child node is created that is labeled as either representing a failure or not representing a failure (S114).

Figure 1B:
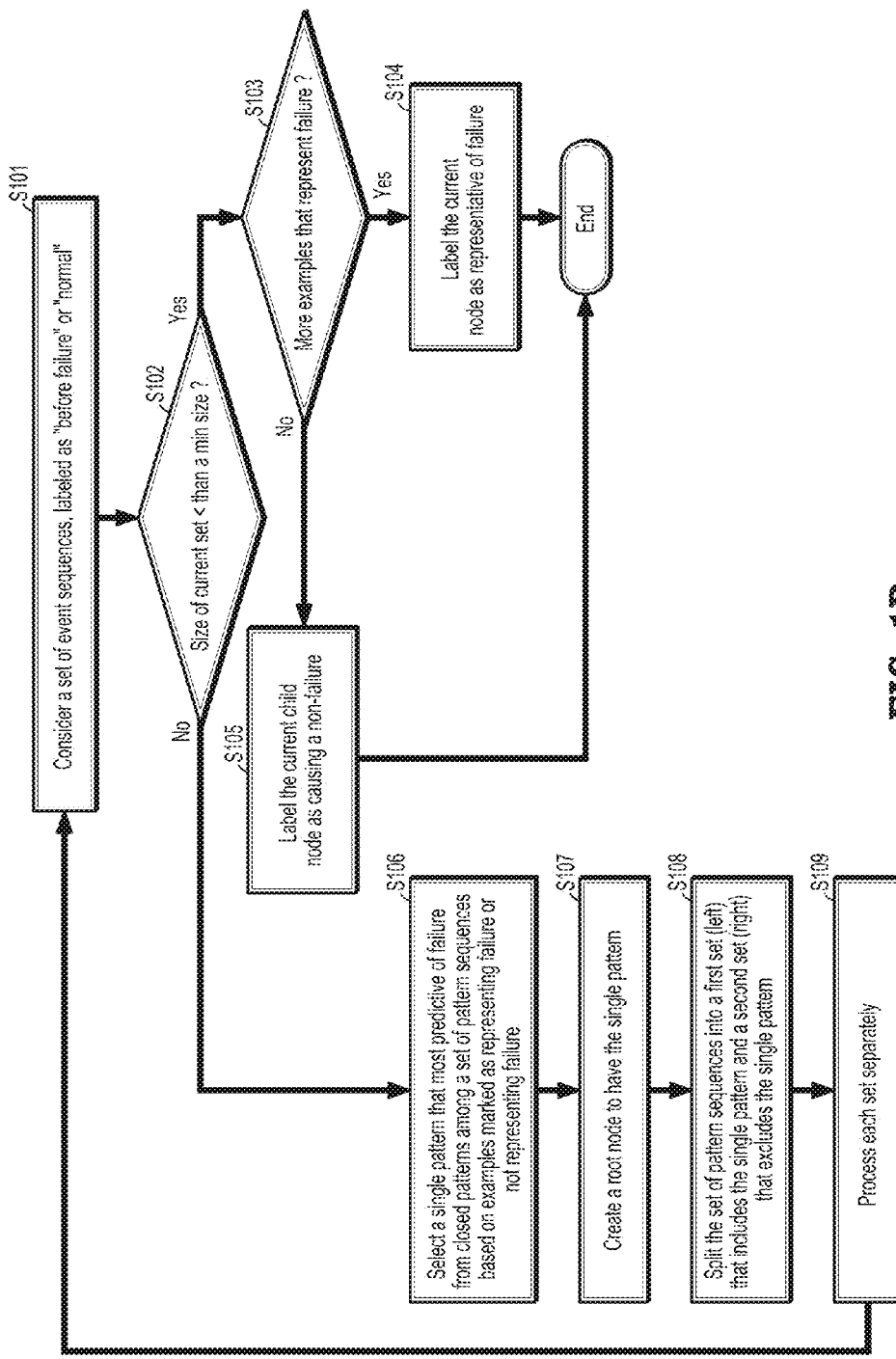
FIG. 1B illustrates a high-level flow chart of a method of building a failure-predictive model according to an exemplary embodiment of the invention.

Referring to FIG. 1B, a method of building a failure-predictive model according to an exemplary embodiment of the invention includes: receiving an input of a set of sequences, labeled as indicating that a failure will result (e.g., "before a failure") and indicating that a failure will not result (e.g., "normal") (S101). The method further includes determining whether a size of a current set of sequences is less than a minimum size (S102). If the size is not less than the minimum size, the method selects a single pattern that is most predictive of failure from closed patterns among a set of pattern sequences based on examples of each pattern sequence marked to indicate whether the corresponding pattern sequence will cause a failure or a non-failure (S106), creating a root node to have the single pattern (S107), splitting the set of pattern sequences into a first set that includes the single pattern and a second set that excludes the single pattern (S108), and processing each set separately by returning to step S101 (S109). The step (S106) when re-run for each of the first and second sets, creates a child node off the root node with a pattern from among the current set (e.g., the first set).

In an exemplary embodiment, the step of determining if the current set size is less than the minimize size, is replaced with a step of determining whether the purity of the set is above a pre-defined level. Purity is usually measured by entropy or Gini Impurity Index and indicates to what extent all examples in the node fall into the same class, i.e., have the same label. In an exemplary embodiment, the step of determining if the set size is less than the minimize size, is replaced with a step of determining whether a current tree depth equals a maximum tree depth.

If the size of the current set is less than the minimum size, the method continues by determining whether the current set has more examples that cause failure (S103). If the current set has more examples that cause a failure, the current node is labeled as representing a failure (S104). If the current set does not have more examples that cause a failure (e.g., more examples cause a non-failure), the current node is labeled as representing a non-failure (S105).

Figure 3:
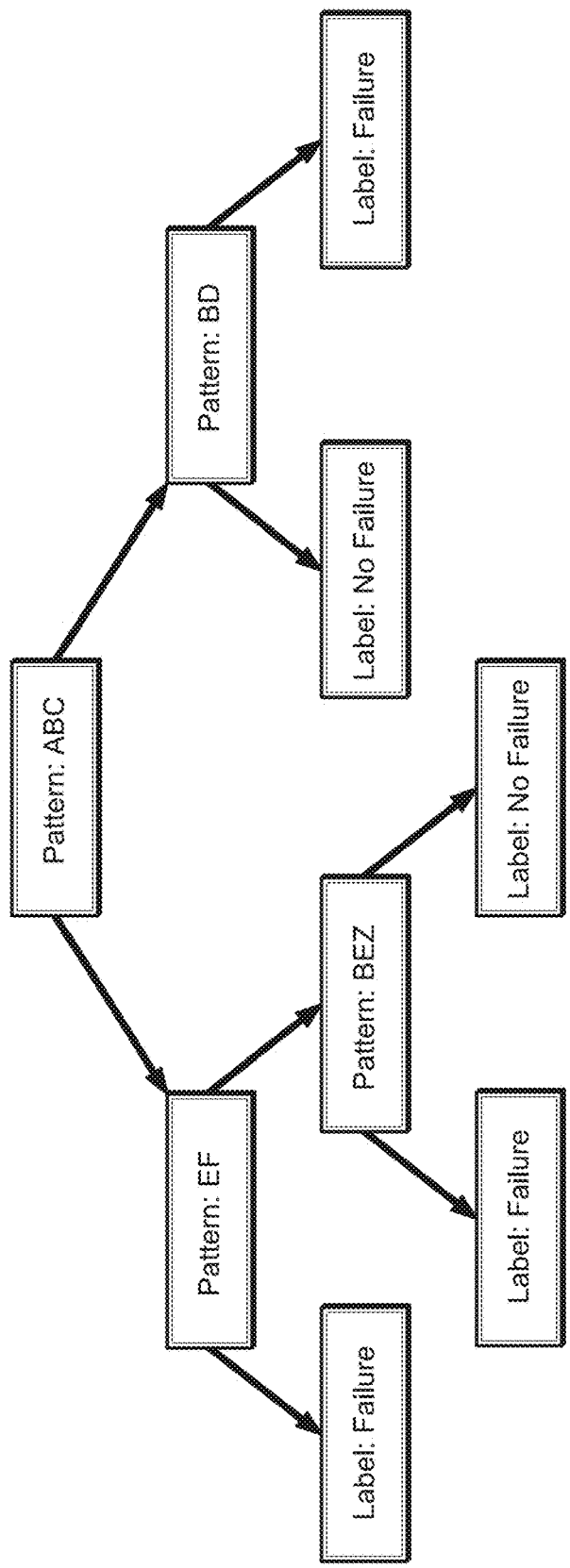
FIG. 3 shows an example of tree model built using a method according to an exemplary embodiment of the invention.

The result from the method is a decision tree that can be traversed to determine whether a new pattern sequence is likely to cause a failure. FIG. 3 is an example of a decision tree that could have been generated by running the method of FIG. 1.

Figure 2:
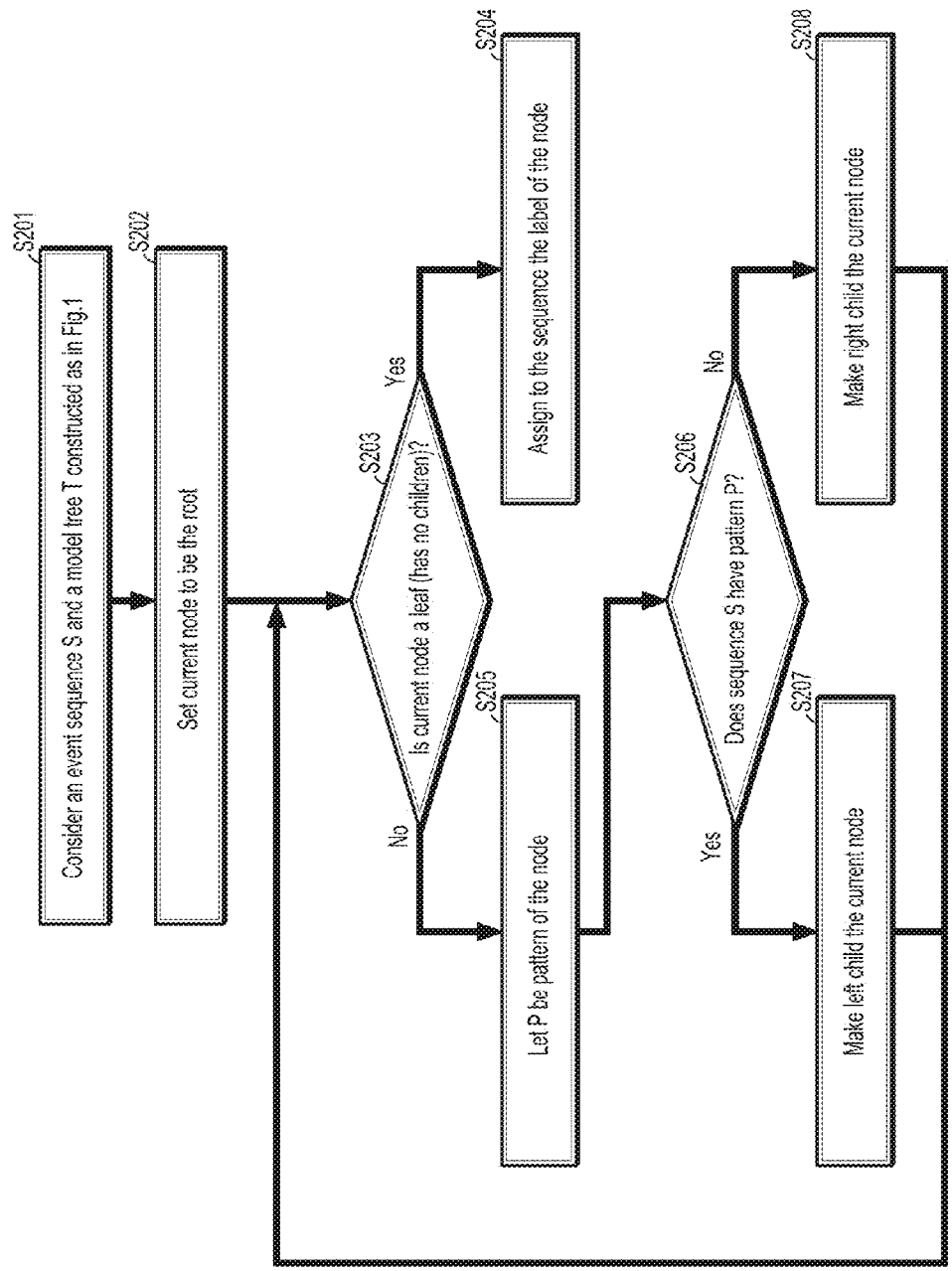
FIG. 2 illustrates a high-level flow chart of a method of traversing a tree generated by FIG. 1, according to an exemplary embodiment of the invention.

FIG. 2 illustrates a method according to an exemplary embodiment of the invention for determining whether a failure will occur based on a new event sequence S and a decision tree generated from examples labeled as either representing a failure or not representing a failure (e.g., generated from FIG. 1). The method includes: receiving an input of a new event sequence S a decision tree (e.g., the decision tree shown in FIG. 3) (S201), traversing to the root node (S202), determining if the current node is a leaf (S203), and assigning the new event sequence S the label of the current node (S204). If the current node is not a leaf, the method includes assigning a temporary value (e.g., P) to be a pattern of the node (S205). The method further includes determining if the pattern P of the current node occurs in the new pattern sequence S (S206). Steps S203-S208 are repeated until the process terminates (in Step 204).

The following example is discussed with respect to the decision tree of FIG. 3. For example, if the new event sequence is "ABCEF" and the decision tree is the tree of FIG. 3, the method first advances to the root node having pattern "ABC". Since this is not a leaf, the method determines whether new event sequence "ABCEF" has pattern "ABC". Since the new event sequence "ABCEF" does have "ABC", the method makes the left child the current node, namely the node with pattern "EF". Since this node is not a leaf, the method next determines whether the new event sequence "ABCEF" has "EF". Since the sequence does include "EF", the method makes the left child the current node, namely the left child of the node labeled "EF". Since this left child is a leaf, the method assigns the sequence "ABCEF" the label of the left child, namely "Failure".

As discussed above, the single pattern that is most predictive of failure is selected from the closed patterns. The closed patterns may be determined from among the set of patterns using the Bi-directional extension (BIDE) algorithm. The selection of the single most predictive pattern is performed by modifying the BIDE algorithm according to an exemplary embodiment of the invention to use class information. The modified BIDE algorithm will hereinafter be referred to as BIDE-Discriminative.

For ease of discussion of the BIDE and Bide-Discriminative algorithms, it will be assumed that there are three different possible log messages, an "A" message, a "B" message, and a "C" message. For example, FIG. 4 shows an example of a sequence database that includes four previously recorded message sequences where each corresponds to a unique sequence identifier. However, the invention is not limited to a sequence database of any particular number of message sequences, as more than four messages may have been recorded.

Before BIDE, a typical mining algorithm would mine all the frequent patterns. If the frequency is 2, mining the sequence database of FIG. 4 would result in 17 sequential patterns {A:4, AA:2, AB:4, ABB:2, ABC:4, AC:4, B:4, BB:2, BC:4, C:4, CA:3, CAB:2, CBC:2, CAC:2, CB:3, CBC:2, CC:2} since all of these patterns appear at least twice. For example, among the recorded four message sequences, there are two occurrences of "ABB", since the $2^{nd}$ message sequence of FIG. 4 includes ABCB (e.g., ABB results when C is ignored) and the $4^{th}$ message sequence of FIG. 4 includes "ABB".

However, use of BIDE on the sequence database of FIG. 4 results in 6 closed patterns {AA:2, ABB:2, ABC:4, CA:3, CABC:2, CB:3}. A pattern is closed if cannot be absorbed by another one of the patterns with the same frequency. For example, pattern "BB" is not closed since it can be absorbed by "ABB". While pattern "CA" is present within closed pattern "CABC", since "CA" occurs more times than "CABC", it cannot be absorbed.

Exemplary pseudo-code of the BIDE algorithm is illustrated in FIG. 5. The BIDE algorithm generates the set of frequent closed patterns F. A pattern is considered to be one of the closed patterns if it has minimum support $\mu$. For example, in the above example of 6 closed patterns {AA:2, ABB:2, ABC:4, CA:3, CABC:2, CB:3}, the minimum support t=2. If the minimum support μ were instead 3, then the resulting closed patterns would be {ABC:4, CA:3, CB:3}.

BIDE is initially called with the full sequential database D, minimum support and an empty pattern P=ø. BIDE returns a list of the closed sequential patterns. BIDE operates by recursively extending patterns (e.g., A, then AA, then AAB, etc), and while their frequency is above the minimum support, checking closure properties of the extensions.

If a frequent pattern P={$p_i$}, i=1, . . . , n is considered, there are two ways to extend pattern P forward with item j. For example, the set $p_{n+1}$={j} may be appended to P obtaining P'=$p_1$ . . . $p_n p_{n+1}$, called a forward-S(equence)-extension, or by adding j to the last itemset of P: P'=$p_1$ . . . $p'_n$, with $p'_n$=$p_n$∪j, assuming jE$p_n$, called a forward-I(tem)-extension.

Similarly, a pattern can be extended backward by inserting the set $p_x$={j} into P anywhere before the last set obtaining P'=$p_1$ . . . $p_i p_x p_{i+1}$ . . . $p_n$, for some 0≤i≤n, called a backward I-extension, or by adding j to any set in P obtaining P'=$p_1$ . . . $p'_i$ . . . $p_n$, with $p'_i$=$p_i$∪j, assuming j∈$p_n$, 1≤i≤n, called a backward-I(tem)-extension.

A pattern is closed if there exists no forward-S-extension item, forward-I-extension item, backward-S-extension item, nor backward-I-extension item with same support.

Furthermore, if there is a backwards extension item all of its future extension are explored in a different branch of recursion, meaning that it can be pruned from current analysis. These insights are combined in BIDE, leading to a very memory-efficient algorithm, because the patterns found do not need to be kept in memory while the algorithm is running.

Referring to lines 3-4 of the pseudo-code of FIG. 5, items that can be used in forward extension of the current pattern are found. If there is no forward extension with the same support (see line 5 of the pseudo-code of FIG. 5), the backward closure is checked (see line 6 of the pseudo-code of FIG. 5) using function backScan. If the pattern is also backwards-closed, it can be added to the set of closed frequent patterns (see line 7 of the pseudo-code of FIG. 5). Then, every item is checked in forward S and I extensions (in the two for-loops) to see whether it is explored in a different branch of recursion, again via the backScan function (see lines 12 and 18 of the pseudo-code of FIG. 5). If not, then the database is projected on the extension and BIDE is called recursively on the extension and the new projected database.

Figure 6:
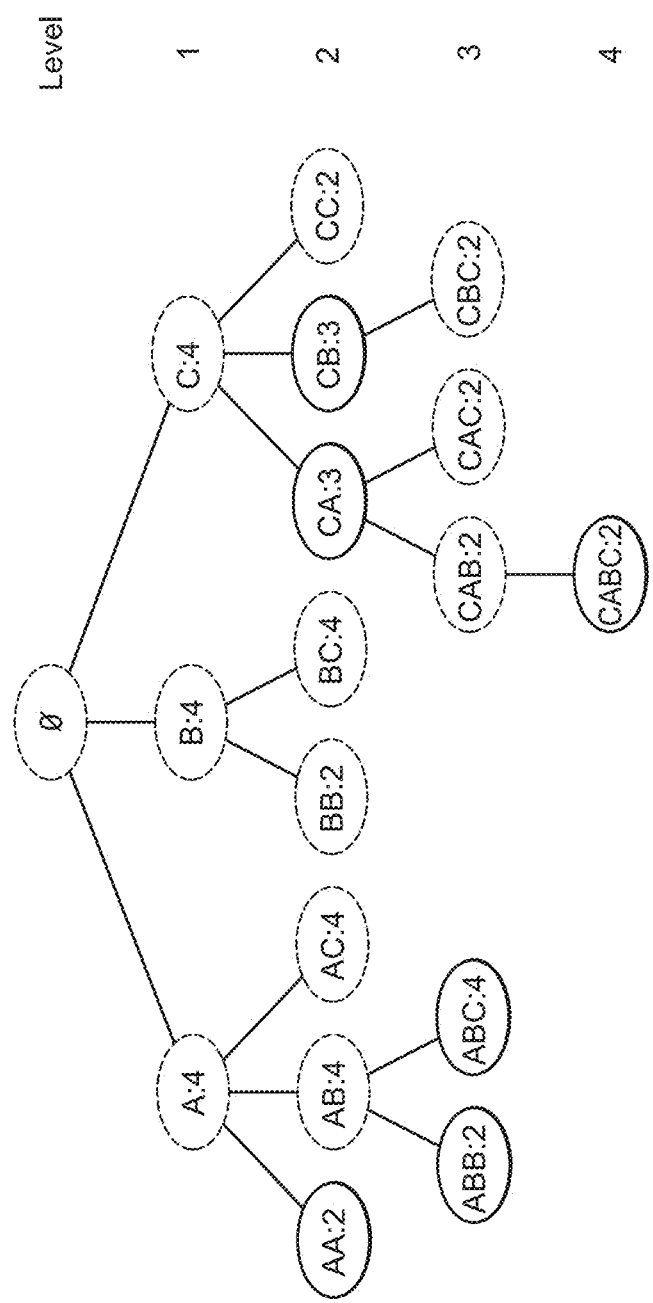
FIG. 6 shows, in the form of a tree, how BIDE traverses the space of patterns.

FIG. 6 illustrates a decision tree that illustrates the result of performing the BIDE algorithm on pattern sequences like those illustrated in FIG. 4. For example, in FIG. 6, the patterns illustrated in dotted nodes are the non-closed patterns that were omitted by the BIDE algorithm and the patterns in the solid nodes are the closed patterns that were retained by the BIDE algorithm.

However, BIDE cannot be used by itself to predict whether a new message sequence is likely to cause a failure. Thus, a modified version of BIDE, according to an exemplary of the invention, namely, BIDE-Discriminative, keeps track of class label information, and accordingly the class distribution in the dataset D is known. For example, as shown in FIG. 7, in addition to recording the pattern sequences, class information is recorded for each pattern sequences. For example, the 3$^{rd}$ column of FIG. 7 indicates whether a particular pattern sequence is classified into one of two classes, namely "representing a failure", or "not representing a failure".

As discussed above, each symbol within a particular pattern sequence may correspond to a distinct log message that was logged by a computer. The order of the symbols in the particular pattern may be been determined by a time stamp located within each of these messages. Examples of pattern sequences classified as not representing a failure can be acquired by recording a predetermined sequential number of log messages from a healthy machine (e.g., no recent failures or errors have been logged). Examples of pattern sequences classified as representing a failure can be acquired by recording a predetermined sequential number of log messages that occur immediately prior to a log message indicating a failure or an error (e.g., "shutting down due to failure", "buffer overrun error", etc).

The class distribution D of where sequences occur is kept track of in BIDE-Discriminative when a search for potential S and I extensions is performed. Thus, the needed information for determining Information Gain (IG) and its upper bound for any new pattern can be discovered. We note that other measures of patterns' predictive potential can be used in place of IG, assuming there are ways to put an upper bound on their value. An example of another such measure is chi-squared score.

FIG. 8 illustrates exemplary pseudo-code of a function that performs a BIDE-Discriminative algorithm according to an exemplary embodiment of the invention. Like step S106 of FIG. 1, the result of performing this function, determines a single most predictive pattern for predicting failure among a set of pattern sequences. The pseudo-code essentially builds a decision tree in the same manner as BIDE but prunes down certain branches of computation using the upper bounds on the Information Gain.

Figure 9:
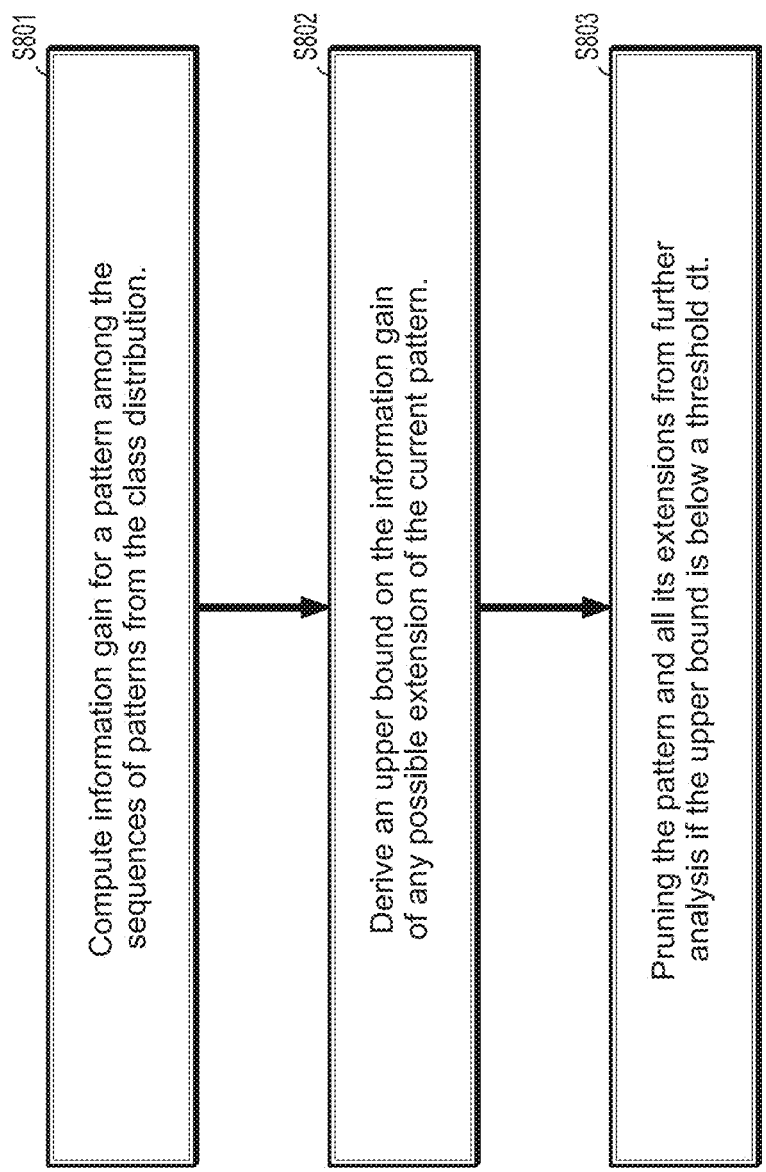
FIG. 9 illustrates a method of pruning a decision tree according to an exemplary embodiment of the invention.
Figure 10:
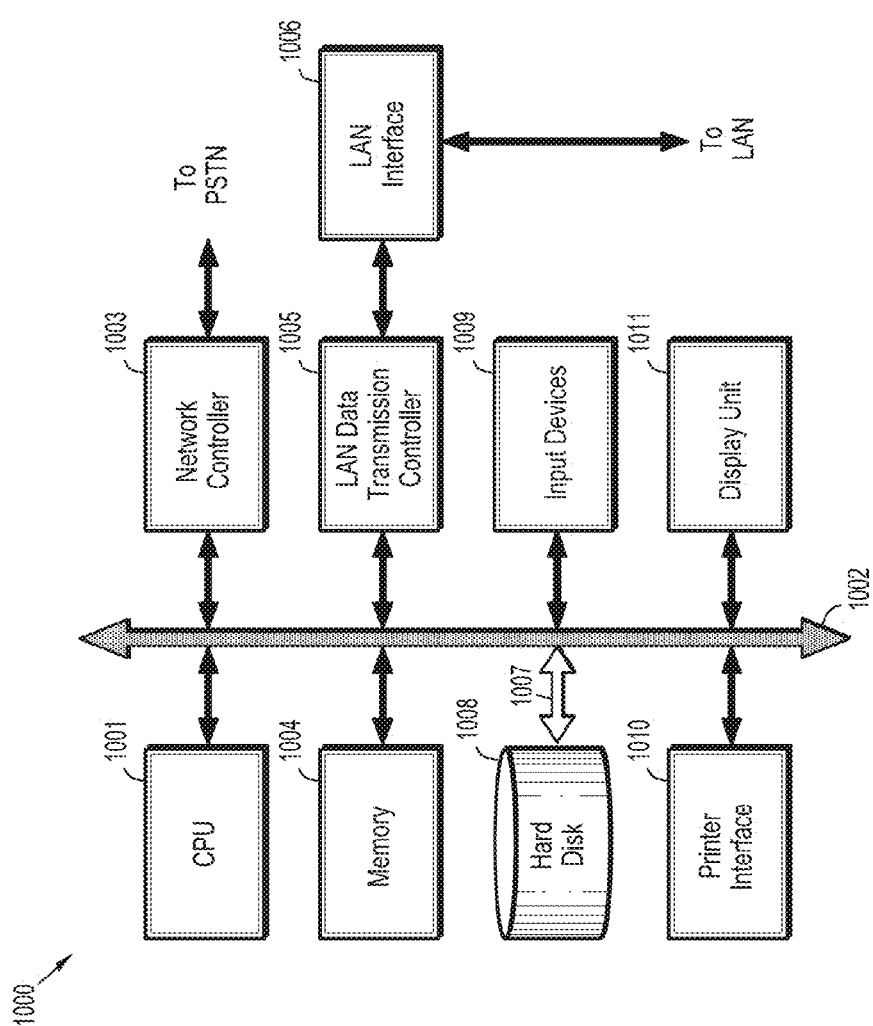
FIG. 10 illustrates an example of a computer system capable of implementing methods and systems according to embodiments of the present invention.

FIG. 9 illustrates a method of pruning a branch of the pattern space. Referring to FIG. 9, the method includes: deriving information gain for a pattern among the sequences of patterns from a class distribution (S801). For example, the class distribution indicates which of the sequences cause a failure and which of the sequences do not cause a failure. The method further includes deriving an upper bound of the information gain (S802), and pruning the pattern and all its extensions and exiting the function if the upper bound is below a threshold dt (S803) (see lines 1-10 of the function of FIG. 8). For example, if the pattern is "AB", and the upper bound of its information gain is less than the threshold dt, the pattern "AB" along with its extension "ABB" would be pruned. If the upper bound is not below the threshold dt, the function continues.

In line 11 of the function, the information gain IG of the pattern itself is checked against the threshold dt, to determine if the pattern should be added to the set of patterns to return. Regardless of the result, the extensions of the current pattern are still examined, since the upper bound on the information gain was above the threshold. When, as in the exemplary disclosure, we want BIDE-Discriminative to return only a single pattern, we update dt to be the highest IG value seen so far and update our pattern list to retain only the corresponding pattern. This is further discussed below.

The determination of the information gain and the upper bound will be discussed in detail below with respect to Table 1. It is assumed that a dataset D of labeled examples ($x_i$, $y_i$), i=1, N is present where y∈C is a set of class labels: C=$c_j$, j=1, . . . , k. The term $s_j$ is support of pattern P in class $c_j$, namely, the number of examples of class $c_j$ that contain/match pattern P. Also, the term s(P) is the total support of P, namely the sum of support over all classes c∈C. Table 1 shows the relationship between these values (e.g., a co-occurrence matrix between pattern P and classes C).

TABLE 1

|  | Class $c_1$ ... Class $c_k$ | Total |
|---|---|---|
| P present | $s_1(P)$ ... $s_k(P)$ | $s(P)$ |
| P absent | $\|c_1\| - s_1(P)$ ... $\|c_k\| - s_k(P)$ | $N - s(P)$ |
|  | $\|c_1\|$ ... $\|c_k\|$ | $N$ |

The information gain IG for a pattern may be determined using Equation 1 as follows:

$$IG(P) = \sum_{c \in C} l\left(\frac{|c|}{N}\right) - \frac{s(P)}{N}\sum_{c \in C} l\left(\frac{s_c(P)}{s(P)}\right) - \frac{N - s(P)}{N}\sum_{c \in C} l\frac{|c| - s_c(P)}{N - s(P)} \quad \text{[Equation 1]}$$

The first term in Equation 1 is fixed for a given dataset, since it depends only on class distribution and is the same for all patterns. Therefore, for a fixed dataset, IG(P) is a function of conditional distribution p(c|x) which can be fully represented by a vector of class supports $s_c(P)$. The term l may be determined using Equation 2 as follows:

$$l(p) = p \log_2(p) \quad \text{[Equation 2]}.$$

IG(P) can be written $IG(s_1(P), \ldots, s_k(P))$. The upper bounds on IG may be determined using Equation 3 as follow:

$$IG_{ub}(r,q) = \max(IG(r,0), IG(0,q)) \quad \text{[Equation 3]}$$

where r=s+(P) and q=s−(P).

The threshold dt is adjusted so that the single most predictive pattern for predicting a failure is output. For example, if more than one pattern with IG above a threshold dt output, the BIDE-Discriminative algorithm can be continuously re-run with an ever decreasing threshold dt until only one pattern is output.

In an exemplary embodiment of the invention, the BIDE-Discriminative algorithm can be modified to output several top-K patterns with IG above a threshold. In this embodiment, the size of the set F is restricted to be at most K. Once the set is full, the threshold (initially set to 0) is set to the lowest score in the set, and then is updated appropriately whenever a pattern with a score higher than the current threshold dt is found and is used to replace the lowest-scoring pattern in F. In an exemplary embodiment, other discriminative measures can be used in place of IG such as a Gini index, a correlation coefficient, or a Chi-square.

FIG. 9 shows an example of a computer system, which may implement the methods and systems of the present disclosure. The system and methods of the present disclosure, or part of the system and methods, may be implemented in the form of a software application running on a computer system, for example, a mainframe, personal computer (PC), handheld computer, server, etc. For example, the method of FIGS. 1, 2, and 9, and the functions of FIGS. 5 and 8 may be implemented as software application(s). These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods or functions described above.

While the above embodiments of the invention has been described with respect to sequences of computer logged messages, at least one embodiment of the invention may be applied to a sequences of sensor data, a sequences of executed instructions in a program execution trace, a sequences of database transactions, a sequence of business transactions, etc. Thus, embodiments of the invention may be applied in the monitoring of performance of medical scanners, power equipment (e.g., turbines, plants), to predict potential failures. Examples could include failure of major components in medical scanners, such as photomultipliers tubes (PMTs), touch pads, light railings, cold-heads. The same can be applied to other complex equipment such as trains and power generation. At least one embodiment of the invention can be applied to analyze business processes to predict the outcome of transactions or sales processes, for example, predicting whether an order is likely to be canceled or not, or identifying list opportunities. At least one embodiment of the invention can be used to predict outcomes from longitudinal patient records, such as likelihood of hospital readmissions, or progression of disease or treatment.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A computer implemented method to predict a failure of a system, the method comprising:
   in a computer processor, receiving temporal data generated by the system;
   in the computer processor, incorporating class information indicating whether each of a plurality of example message sequences contained in the temporal data represents a failure into a Bi-directional extension (BIDE) algorithm to generate a discriminative BIDE (BIDE-discriminative) algorithm;
   using the BIDE-discriminative algorithm to output a single pattern from the message sequences;
   building a decision tree to predict a failure based on the single pattern, wherein each node in the decision tree comprises a node message sequence and a classifier value corresponding to the node message sequence;
   determining whether a new message sequence will cause failure of the system using the decision tree by comparing the new message sequence to one or more node message sequences and assigning the corresponding classifier value to the new message sequence based on the comparison; and
   generating, by the computer processor, a message indicating a predicted failure, if the new message sequence is determined to indicate a cause of failure of the system.

2. The computer implemented method of claim 1, wherein building the decision tree comprises:

in the computer processor, generating a root node having the single pattern;

in the computer processor, splitting the message sequences into a first set including the pattern and a second set excluding the pattern;

in the computer processor, determining, from the class information, a first number of sequences of the first set that represents a failure and a second number of sequences of the first set that represents a non-failure from the class information; and in the computer processor, generating a first child node labeled as representing the failure if the first number is larger than the second number and labeled as not representing the failure if the second number is larger than the first number.

3. The computer implemented method of claim 1, wherein the building of the decision tree further comprises:

determining in the computer processor, from the class information, a third number of sequences of the second set that represents a failure and a fourth number of sequences of the second set that represents a non-failure from the class information; and generating in the computer processor, a second child node labeled as representing the failure if the third number is larger than the fourth number and labeled as not representing the failure if the fourth number is larger than the third number.

4. The computer implemented method of claim 1, wherein using the BIDE-discriminative algorithm comprises:

in the computer processor, for each pattern among the plurality of example message sequences, determining information gain of the pattern based on the class information;

determining an upper bound of the information gain for descendants of each pattern; and performing a BIDE algorithm for each pattern, if the upper bound of the pattern is less than a threshold.

5. The computer implemented method of claim 1, wherein determining whether a new message sequence will cause failure using the decision tree comprises:

in the computer processor, traversing the decision tree starting from a root node until a leaf node is reached; and in the computer processor, assigning the new message sequence a label of the leaf that indicates whether the new message sequence represents a failure.

6. The computer implemented method of claim 5, wherein the traversing comprises:

in the computer processor, determining whether a pattern of a current node of the tree is included within the new message sequence;

traversing to a first child node of the current node if the pattern is included; and traversing to a second child node of the current node if the pattern is not included.

7. A computer implemented method to build a failure predictive model of a system, the method comprising:

in a computer processor, receiving an input of a set of event sequences generated by the system, where each sequence is labeled as representing a failure or not representing a failure of the system;

in the computer processor, extracting a single predictive closed pattern from among the input event sequences;

in the computer processor, creating a root node with the single closed pattern;

in the computer processor, splitting the set of event sequences into a first set that includes the single closed pattern and a second set that excludes the single pattern; and in the computer processor, recursively processing each of the first and second sets, and starting from the root node, branching in a first direction if a message sequence is included in the sequence of the node and branching in a second direction if the message sequence is not included in the sequence of the node until the recursive processing terminates with a child node labeled as representing a failure or not representing a failure.

8. The computer implemented method of claim 7, wherein the processing comprises:

in the computer processor, determining whether a current set has more sequences labeled as representing the failure or more sequences labeled as not representing a failure;

in the computer processor, creating a first child labeled as representing failure if the current set has more sequences labeled as representing the failure and a second child node labeled as not representing failure if the current set has more sequences labeled as not representing the failure.

9. The computer implemented method of claim 8, wherein the determining and creating only occur if a set size of the current set is greater than a predetermined size.

10. The computer implemented method of claim 7, wherein the processing comprises:

selecting one of the first and second sets;

in the computer processor, determining a pattern from among the selected set that represents a failure; and in the computer processor, creating a child node having the pattern.

11. A non-transitory computer readable storage medium embodying instructions executable by a processor to perform method steps for predicting a failure of a system, the method steps comprising instructions for:

in the processor, receiving temporal data generated by the system;

in the processor, incorporating class information indicating whether each of a plurality of example message sequences contained in the temporal data represents a failure into a Bi-directional extension (BIDE) algorithm to generate a discriminative BIDE (BIDE-discriminative) algorithm;

using the BIDE-discriminative algorithm to output a single pattern from the message sequences;

building a decision tree to predict a failure based on the single pattern, wherein each node in the decision tree comprises a node message sequence and a classifier value corresponding to the node message sequence;

determining whether a new message sequence will cause failure of the system using the decision tree by comparing the new message sequence to one or more node message sequences and assigning the corresponding classifier value to the new message sequence based on the comparison; and generating by the processor, a message indicating a predicted failure responsive to the new message sequence being determined to indicate a cause of failure of the system.

12. The non-transitory computer readable medium of claim 11, wherein building the decision tree comprises:

in the processor, generating a root node having the single pattern;

in the processor, splitting the messages sequences into a first set including the pattern and a second set excluding the pattern;

in the processor, determining, from the class information, a first number of sequences of the first set that represents a failure and a second number of sequences of the first set that represents a non-failure from the class information; and in the processor, generating a first child node labeled as representing the failure if the first number is larger than the second number and labeled as not representing the failure if the second number is larger than the first number.

13. The non-transitory computer readable medium of claim 11, wherein the building of the decision tree further comprises:

in the processor, determining, from the class information, a third number of sequences of the second set that represents a failure and a fourth number of sequences of the second set that represents a non-failure from the class information; and in the processor, generating a second child node labeled as representing the failure if the third number is larger than the fourth number and labeled as not representing the failure if the fourth number is larger than the third number.

14. The non-transitory computer readable medium of claim 11, wherein using BIDE-discriminative algorithm comprises:

in the processor, for each pattern among the plurality of example message sequences, determining information gain of the pattern based on the class information;

in the processor, determining an upper bound of the information gain for descendants of each pattern; and in the processor, performing a BIDE algorithm for each pattern, if the upper bound of the pattern is less than a threshold.

15. The non-transitory computer readable medium of claim 11, wherein determining whether a new message sequence will cause failure using the decision tree comprises:

in the processor, traversing the decision tree starting from a root node until a leaf node is reached; and in the processor, assigning the new message sequence a label of the leaf that indicates whether the new message sequence represents a failure.

16. The non-transitory computer readable medium of claim 15, wherein the traversing comprises:

in the processor, determining whether a pattern of a current node of the tree is included within the new message sequence;

in the processor, traversing to a first child node of the current node if the pattern is included; and in the processor, traversing to a second child node of the current node if the pattern is not included.

17. A method to find patterns, the method comprising:

in a computer processor, receiving temporal data generated by a system;

in the computer processor, incorporating class information, indicating whether each of a plurality of example message sequences contained in the temporal data represents a failure of the system, into a Bi-directional extension (BIDE) algorithm to generate a discriminative BIDE (BIDE-discriminative) algorithm; and in the computer processor, using the BIDE-discriminative algorithm to output a requested number of predictive patterns from the message sequences to serve as input to building a decision tree.

18. The method of claim 17, further comprising:

in the computer processor, building the decision tree to predict a failure based on the requested number of patterns; and in the computer processor, determining whether a new message sequence will cause failure using the decision tree, wherein each node in the decision tree comprises a node message sequence and a classifier value corresponding to the node message sequence.

19. The method of claim 18, wherein the BIDE-discriminative algorithm is used to output all patterns with an information gain score above a requested threshold.

* * * * *